United States Patent
Ootani et al.

(10) Patent No.: US 6,480,755 B1
(45) Date of Patent: Nov. 12, 2002

(54) PROCESS CONTROL DEVICE AND PROCESS CONTROL METHOD PERMITTING PROCESSING ORDER AND PROCESSING CONDITION TO BE CHANGED WHILE MANUFACTURING PROCESS CONTINUES

(75) Inventors: Masaki Ootani; Ryuji Takechi; Yasuhiro Marume; Takamasa Inobe; Katuya Oota; Yasuhiro Satou, all of Hyogo (JP)

(73) Assignees: Mitsubishi Denki Kabushiki Kaisha, Tokyo (JP); Ryoden Semiconductor System Engineering Corporation, Hyogo (JP)

( * ) Notice: Subject to any disclaimer, the term of this patent is extended or adjusted under 35 U.S.C. 154(b) by 0 days.

(21) Appl. No.: 09/357,917

(22) Filed: Jul. 21, 1999

(30) Foreign Application Priority Data

Feb. 4, 1999 (JP) .......................................... 11-027326

(51) Int. Cl.$^7$ .............................................. G06F 19/00
(52) U.S. Cl. ........................... 700/105; 700/95; 700/97; 700/112
(58) Field of Search ........................... 700/95, 97, 105, 700/112

(56) References Cited

U.S. PATENT DOCUMENTS

| | | | | |
|---|---|---|---|---|
| 5,099,431 A | * | 3/1992 | Natarajan | 700/105 |
| 5,191,534 A | * | 3/1993 | Orr et al. | 700/105 |
| 5,521,828 A | * | 5/1996 | Ueda | 700/105 |
| 6,240,330 B1 | * | 5/2001 | Kurtzberg et al. | 700/121 |

FOREIGN PATENT DOCUMENTS

| | | |
|---|---|---|
| JP | 6-290085 | 10/1994 |
| JP | 9-320918 | 12/1997 |

\* cited by examiner

Primary Examiner—Thomas Black
Assistant Examiner—Ronald D Hartman, Jr.
(74) Attorney, Agent, or Firm—McDermott, Will & Emery (57) ABSTRACT

A process control device includes: a change table detection unit to determine existence of a change table corresponding to a progress file; a progress file adjustment unit to change, when the change table detection unit determines that there exists a change table, the content of the progress file based on the change table; a unit to control a transport device of an item in process based on the progress file changed by the progress file adjustment unit; and a unit to control a manufacturing device of the item based on the progress file changed by the progress file adjustment unit. The manufacturing device control unit controls the manufacturing device based on the progress file that has been changed by the progress file adjustment unit, and thus, it is possible to change the processing orders, processing conditions and the like even when individual items are in respective manufacturing steps.

12 Claims, 8 Drawing Sheets

| CONTROL CONDITION NUMBER | DEVICE | CONTROL | EVALUATION |
|---|---|---|---|
| | AVAILABLE DEVICE NAME 1 | CONTROL CONDITION 1 FOR THE DEVICE | REPORTED DATA EVALUATING CONDITION 1 |
| CONTROL 11-A | AVAILABLE DEVICE NAME 2 | CONTROL CONDITION 2 FOR THE DEVICE | REPORTED DATA EVALUATING CONDITION 2 |
| | AVAILABLE DEVICE NAME 3 | CONTROL CONDITION 3 FOR THE DEVICE | REPORTED DATA EVALUATING CONDITION 3 |

| LOT NUMBER | 12345 |
|---|---|
| PRODUCT TYPE | AA-A |
| PRESENT PROGRESS STATE | STEP 11 |
| CHANGE TABLE DATA | |

| PRODUCT TYPE | AA |
|---|---|
| PRODUCT TYPE SUB-NUMBER | A |
| LOT NUMBER | △△△△△ |
| STEP NAME | STEP 12 |
| CHANGE | CONTROL 12-B |

| PRODUCT TYPE | AA |
|---|---|
| PRODUCT TYPE SUB-NUMBER | A |
| LOT NUMBER | △△△△△ |
| STEP NAME | STEP 12 |
| CHANGE | PRODUCT TYPE AA-B |

90

PROCESS CONTROL DEVICE AND PROCESS CONTROL METHOD PERMITTING PROCESSING ORDER AND PROCESSING CONDITION TO BE CHANGED WHILE MANUFACTURING PROCESS CONTINUES

BACKGROUND OF THE INVENTION

1. Field of the Invention

The present invention relates to a process control technique for use in production management of semiconductor devices, liquid crystal substrates and the like, and more particularly, to a process control device and a process control method permitting changes in processing orders, processing conditions and the like during a manufacturing process.

2. Description of the Background Art

In recent years, most semiconductor devices and liquid crystal substrates have been manufactured automatically. Thus, the function of a process control device controlling such process largely affects the production efficiency. Generally, production management in a production line is done by causing a process control device to memorize reference information such as processing orders and processing conditions of products for each kind of product, and to control those processing orders and conditions according to the reference information.

In a conventional process control device, such reference information must be changed when a processing order or processing condition of a product is added or altered. When changing the reference information without halting the manufacturing process, however, unfinished items are still in the respective process steps defined by the presently active reference information. Therefore, the entire manufacturing process must be halted before changing the reference information. In addition, an operator must decide whether the change in the reference information can be applied to the items in the process, and if so, the operator needs to perform the operation required for that change manually.

As described above, the change of the reference information in a conventional process control device leads to deterioration in the efficiency of the operation, and in the worst case, such altered reference information may not have been applied to some of the finished products. Techniques addressing such a problem include those disclosed in Japanese Patents Laying-Open Nos. 6-290085 and 9-320918.

The invention disclosed in the Japanese Patent Laying-Open No. 6-290085 relates to a lot management method in which working data stored in a database are read out to designate working condition for each work on respective manufacturing lots. A validation date and an invalidating date for the working data are stored in a file layout of the working data, and the work is performed only between those dates.

The invention disclosed in the Japanese Patent Laying-Open No. 9-320918 relates to a production control system that allows automatic, collective change of manufacturing conditions when changing the conditions on manufacturing steps of a plurality of kinds of articles, by a combined pattern of kind of article, process and manufacturing condition.

The invention disclosed in the Japanese Patent Laying-Open No. 6-290085, however, is unable to address an accidental case in which there arises an improper or defective processing condition, for example, since it is required to set in advance the validating and invalidating dates. In addition, the invention does not solve the problem that, at the time when the data becomes invalid, items in process remain unfinished, as described above.

The invention disclosed in the Japanese Patent Laying-Open No. 9-320918 allows collective change of common part data for respective process procedures by the combined pattern of the kind of article, process and manufacturing condition. However, it also is unable to deal with the case of an improper processing condition, and again, it does not solve the problem with the unfinished items in process.

SUMMARY OF THE INVENTION

An object of the present invention is to provide a process control device permitting processing orders and processing conditions to be changed even when individual items are in respective manufacturing steps.

Another object of the present invention is to provide a process control method permitting processing orders and processing conditions to be changed even when individual items are in respective manufacturing steps.

According to an aspect of the present invention, the process control device includes: a change table detection unit that determines whether there exists, corresponding to a progress file representing a manufacturing state, a change table containing the content of change for the progress file; a progress file adjustment unit that changes, when the change table detection unit determines that there exists a change table, the content of the progress file according to the content in the change table; a unit that controls a transport device of items in process based on the progress file changed by the progress file adjustment unit; and a unit that controls a manufacturing device of the items based on the progress file changed by the progress file adjustment unit.

The above manufacturing device control unit controls the manufacturing device based on the progress file that has been changed by the progress file adjustment unit. Accordingly, it is possible to change processing orders, processing conditions and others even when items are in respective manufacturing steps.

According to another aspect of the present invention, the process control method includes the steps of: determining whether there exists, corresponding to a progress file representing a manufacturing state, a change table containing the content of change for the progress file; changing, when determined that there exists a change table, the content of the progress file according to the change table; controlling a transport device of items based on the changed progress file; and controlling a manufacturing device of items based on the changed progress file.

Since the manufacturing device is controlled according to the progress file that has been changed, it is possible to change processing orders, processing conditions and the like even when items are in respective manufacturing steps.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
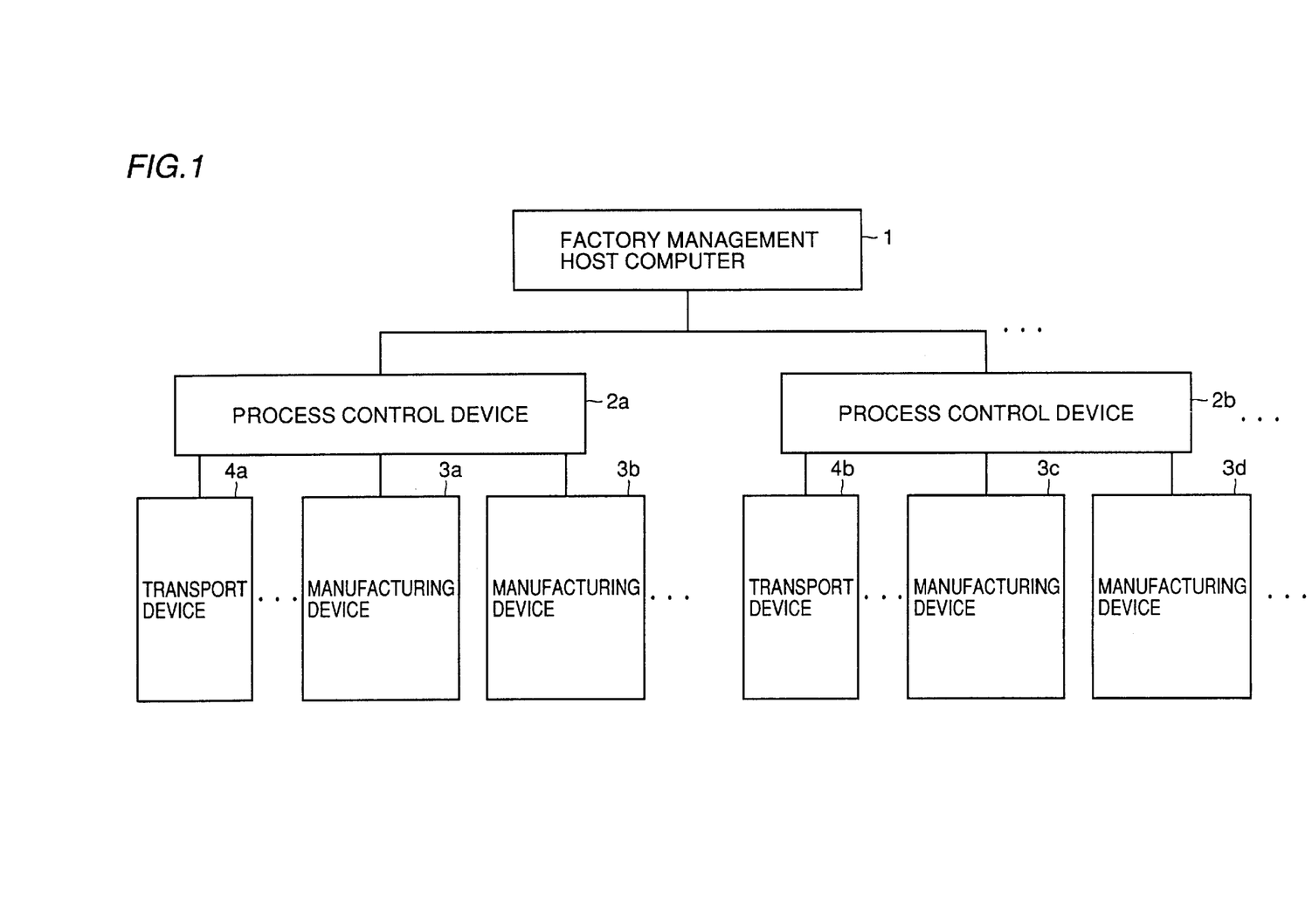
FIG. 1 is a block diagram showing a schematic configuration of a production management system including a process control device according to the present invention.

FIG. 1 is a block diagram showing a schematic configuration of the production management system including a process control device according to an embodiment of the present invention. This production management system includes a factory management host computer 1 controlling the entire production management system, process control devices 2a and 2b performing process control, manufacturing devices 3a to 3d corresponding to respective manufacturing steps, and transport devices 4a and 4b. Data communication between factory management host computer 1 and process control device 2a or 2b is made through LAN (Local Area Network). Process control device 2a or 2b is connected to each manufacturing device 3a–3d via a serial interface or the like, and controls manufacturing devices 3a to 3d and transport devices 4a and 4b by a given communication protocol.

Figure 2:
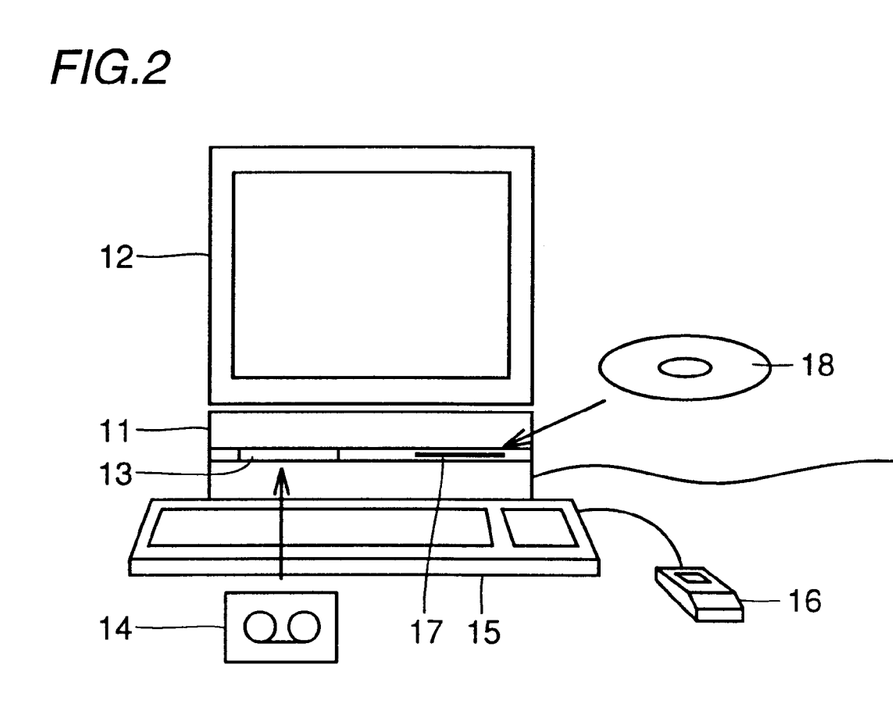
FIG. 2 is a diagram showing an exemplary appearance of the process control device according to the present invention.

FIG. 2 is a diagram showing an example of the appearance of the process control device according to the present invention. The process control device includes a computer main body 11, a graphic display device 12, a magnetic tape device 13 with a magnetic tape 14 mounted thereon, a keyboard 15, a mouse 16, a CD-ROM (Compact Disc-Read Only Memory) device 17 with a CD-ROM 18 mounted thereon, and a LAN interface (not shown). A process control program is provided by a storage medium such as magnetic tape 14, CD-ROM 18 or the like. Computer main body 11 executes the process control program to control the manufacturing devices. Note that the process control program may be provided to computer main body 11 via a communication line from another computer.

Figure 3:
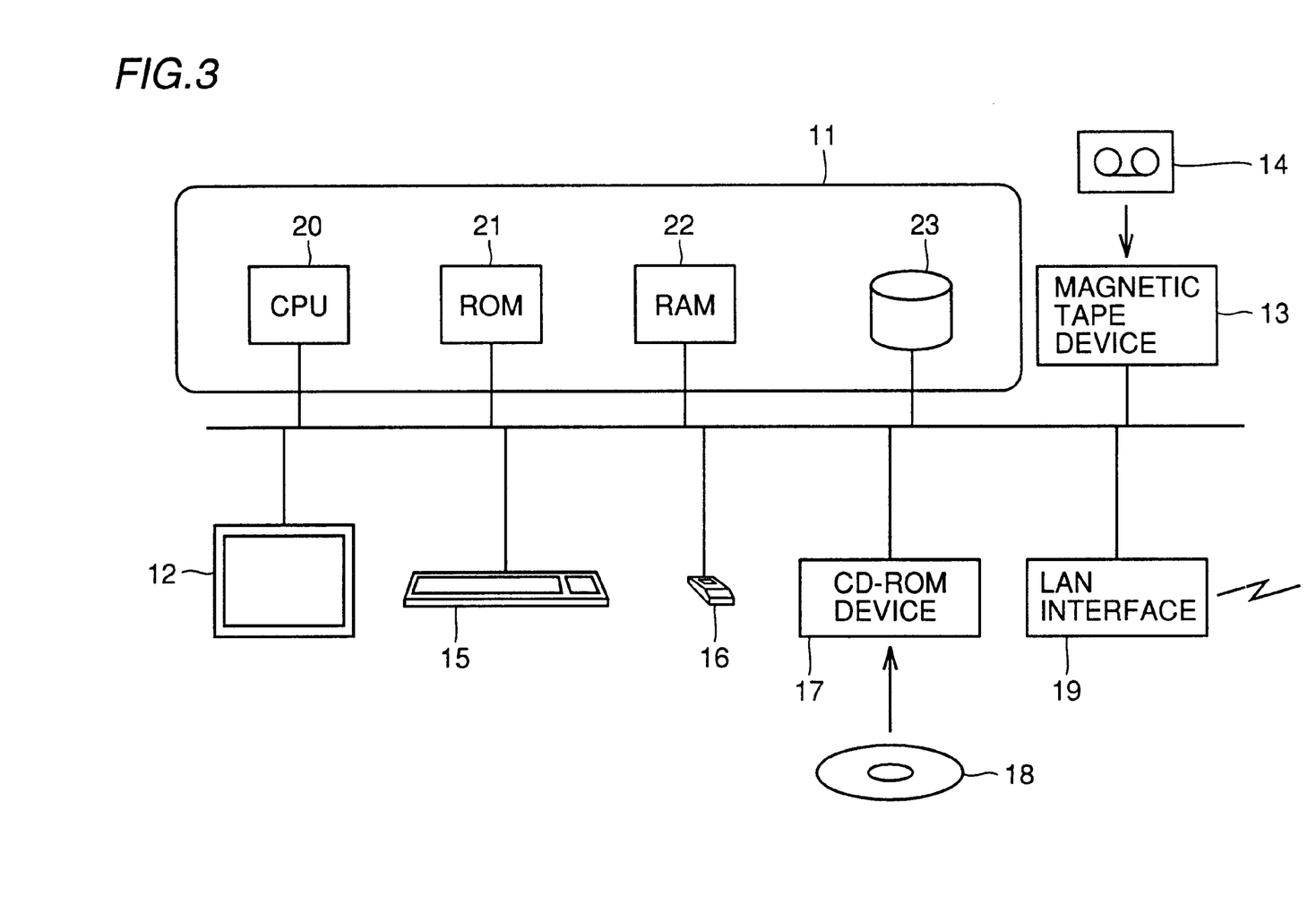
FIG. 3 is a block diagram showing an exemplary configuration of the process control device according to the present invention.

FIG. 3 is a block diagram showing an example of the configuration of the process control device according to the present invention. Computer main body 11 shown in FIG. 2 includes a CPU (Central Processing Unit) 20, a ROM (Read Only Memory) 21, a RAM (Random Access Memory) 22, and a hard disc 23. CPU 20 performs processing while controlling data input/output between itself and graphic display device 12, magnetic tape device 13, keyboard 15, mouse 16, CD-ROM device 17, LAN interface 19, ROM 21, RAM 22 or hard disc 23. The process control program stored in magnetic tape 14 or CD-ROM 18 is temporarily stored in hard disc 23 via magnetic tape device 13 or CD-ROM device 17 by CPU 20. CPU 20 performs process control by temporarily loading the process control program from hard disc 23 to RAM 22 and executing it as appropriate.

Hereinafter, the process control device according to respective embodiments of the present invention will be described. Note that the appearance of the process control device as shown in FIG. 2 as well as the schematic configuration thereof as shown in FIG. 3 are common to all the embodiments.

First Embodiment

Figure 4:
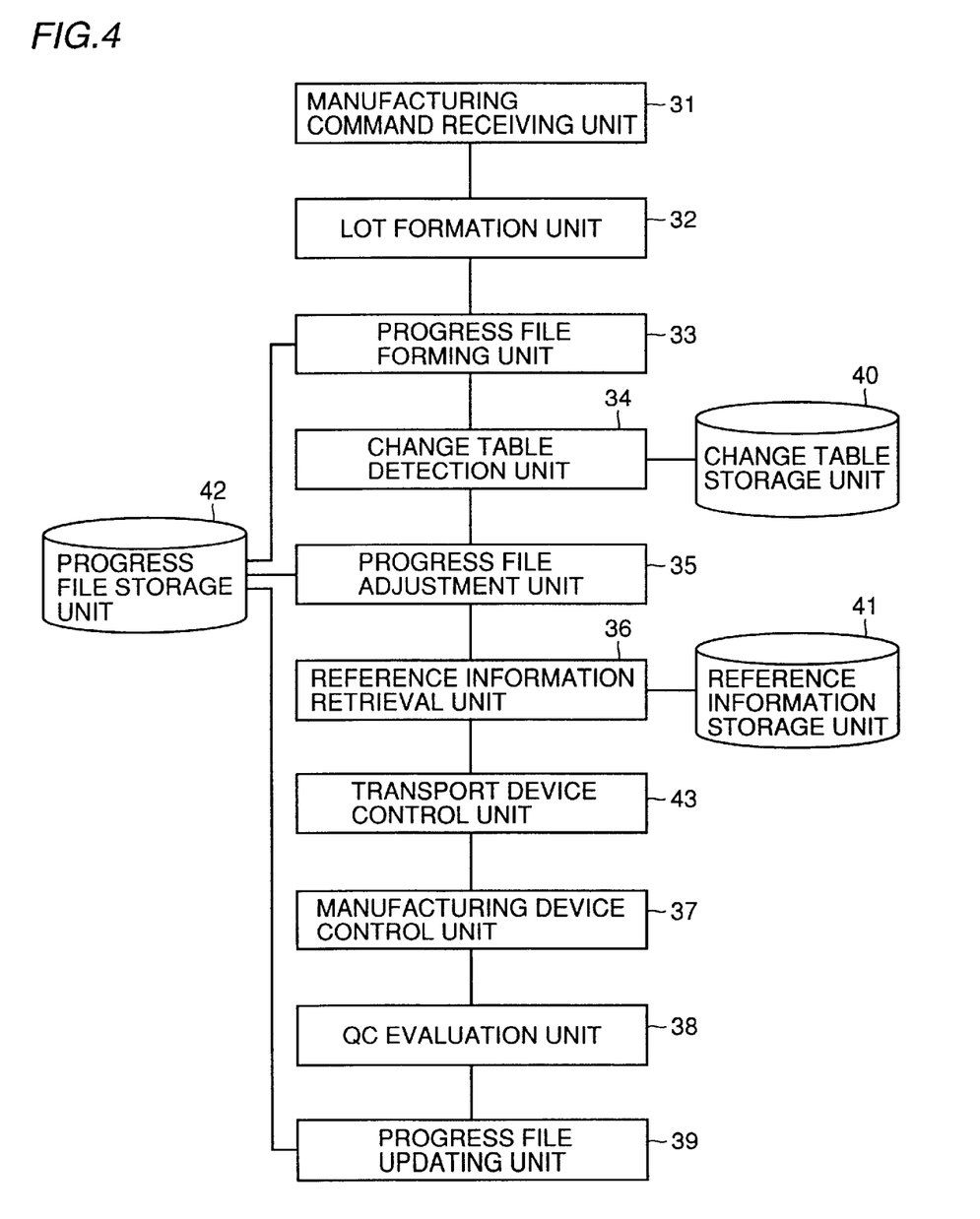
FIG. 4 is a block diagram showing a schematic configuration of a process control device according to a first embodiment of the present invention.

FIG. 4 is a block diagram showing a schematic configuration of the process control device according to the present embodiment. The process control device includes: a manufacturing command receiving unit 31 that receives a manufacturing command from factory. management host computer 1; a lot formation unit 32 that performs formation of manufacturing information of respective products from the manufacturing command received by manufacturing command receiving unit 31 (i.e., lot formation); a progress file forming unit 33 that forms a progress file based on the manufacturing information of respective products formed by lot formation unit 32 and registers the progress file with a progress file storage unit 42; a change table detection unit 34 that determines whether a corresponding change table exists in a change table storage unit 40; a progress file adjustment unit 35 that changes a content of the progress file when the corresponding change table exists; a reference information retrieval unit 36 that retrieves reference information stored in a reference information storage unit 41 to extract a control condition for a process step; a transport device control unit 43 that controls transport to a manufacturing device corresponding to the control condition extracted by reference information retrieval unit 36; a manufacturing device control unit 37 that controls manufacturing devices 3a to 3d based on the control condition of the process step extracted by reference information retrieval unit 36; a QC (Quality Control) evaluation unit 38 that evaluates quality using data reported from manufacturing devices 3a through 3d; and a progress file updating unit 39 that updates the name of the process step in the progress file to that of a subsequent step.

Figure 5:
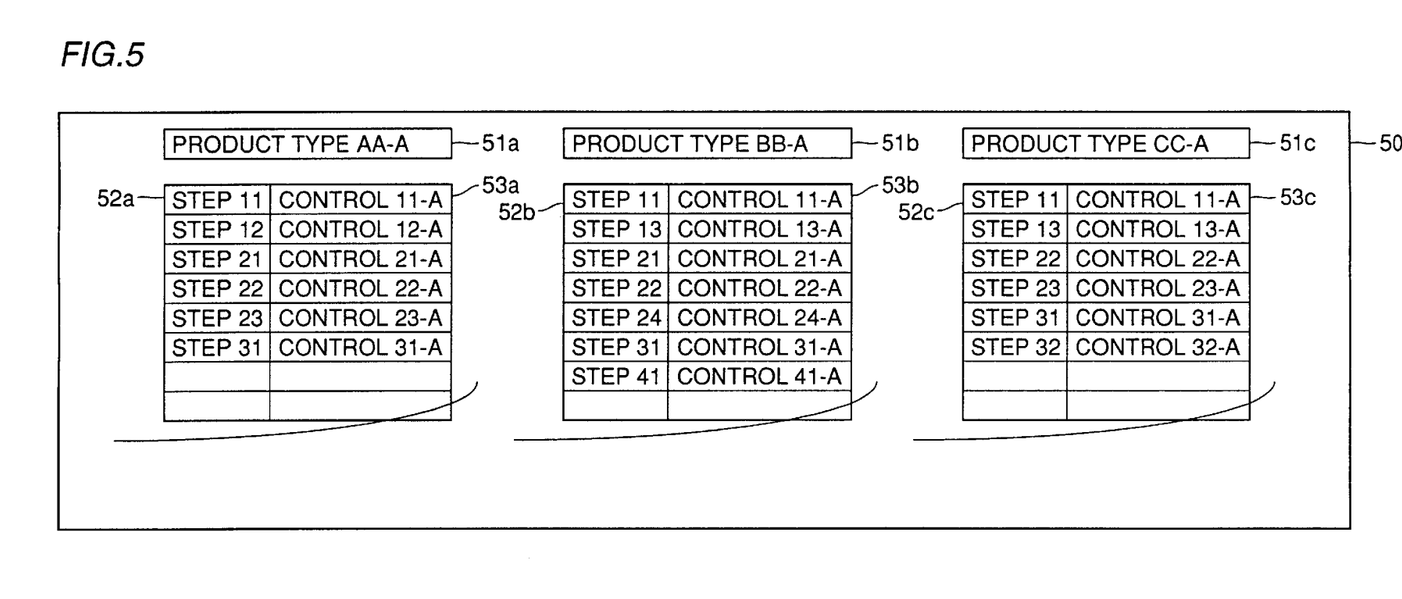
FIG. 5 is a diagram showing an example of the reference information.

FIG. 5 shows an example of the configuration of the reference information. Reference information 50 includes product types 51a to 51c, process step names 52a to 52c, and control condition numbers 53a to 53c. The reference information is defined for each product type 51a–51c. In FIG. 5, three product types are defined. Respective step names 52a to 52c are provided according to processing orders of each product. Control condition numbers 53a to 53c are set corresponding to a control condition table, which will be described later.

The reference information, which is generated by a process engineer using factory management host computer 1, is transferred to the process control device via LAN, and stored in reference information storage unit 41.

Figure 6:
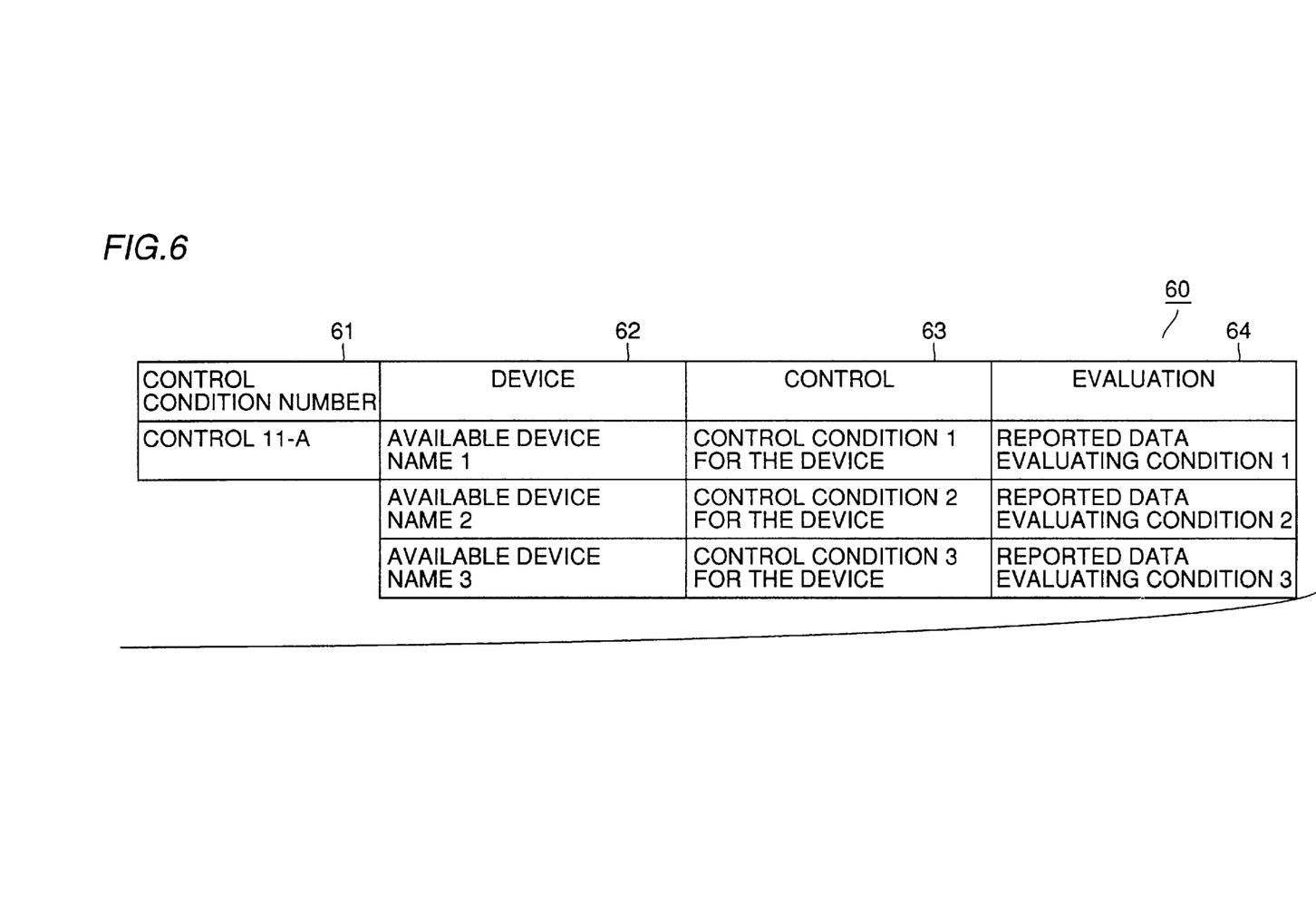
FIG. 6 is a diagram showing an example of the control condition table.

FIG. 6 is a diagram showing an example of the control condition table, which defines control conditions corresponding to respective control condition numbers 53a to 53c set in the reference information. The control condition table includes; a control condition number 61 (which corresponds to control condition numbers 53a to 53c); a name of manufacturing device that is available for the step (hereinafter, referred to as "available device") 62 (which corresponds to manufacturing devices 3a to 3d in FIG. 1); a control condition 63 that is given to the manufacturing device; and a condition for evaluation 64 that is used when performing the QC evaluation on the data reported from the manufacturing device.

Figure 7:
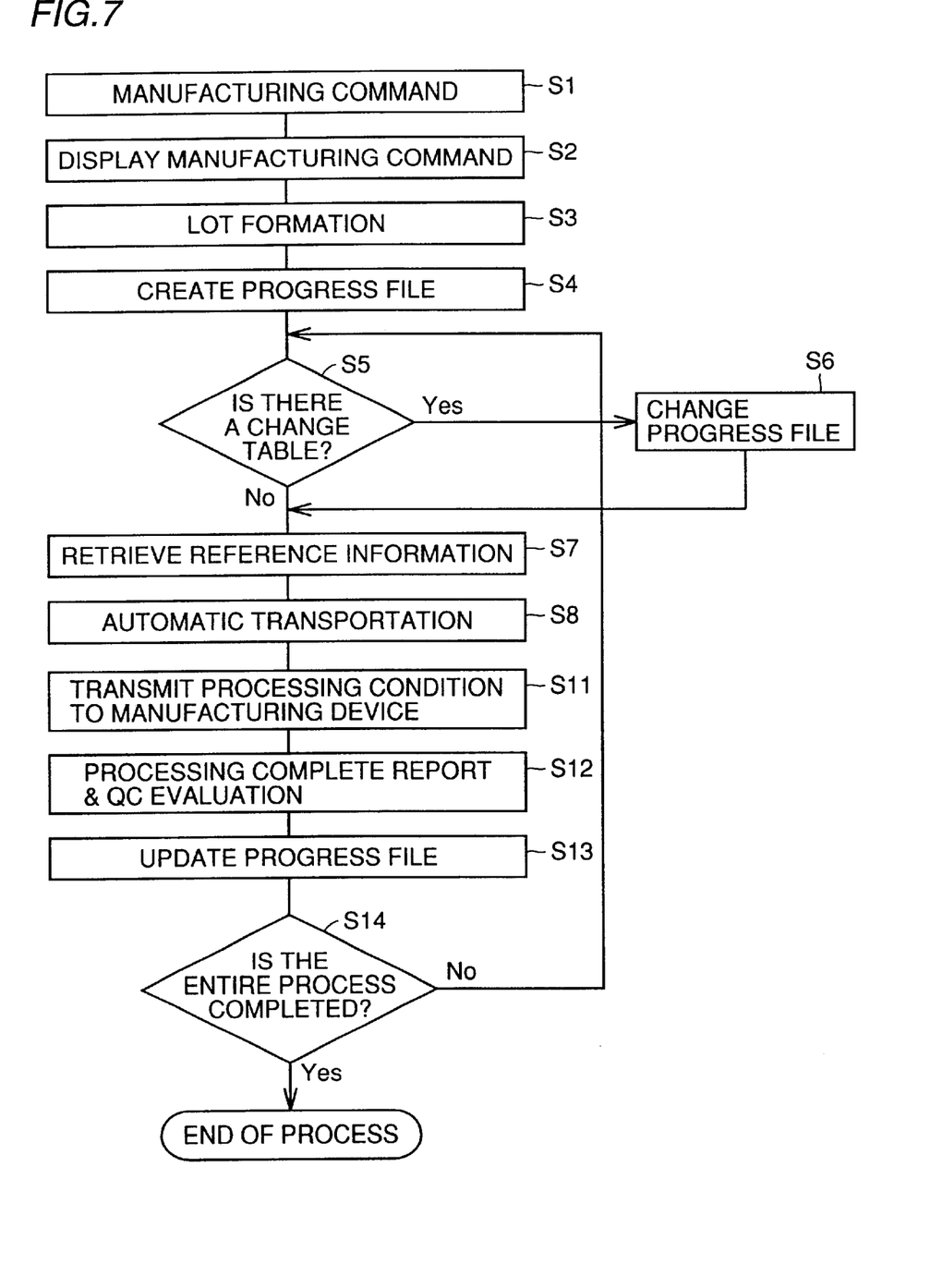
FIG. 7 is a flow chart illustrating a processing procedure of the process control device according to the first embodiment of the present invention.

FIG. 7 is a flow chart illustrating a processing procedure of the process control device according to the present invention. First, manufacturing command information is transferred from factory management host computer 1 to process control device 2a or 2b via manufacturing command receiving unit 31 (Si). This manufacturing command information includes information corresponding to the number of products to be manufactured. The manufacturing command information for each product includes a lot number and a type of the product.

Lot formation unit 32 displays the manufacturing command information received by manufacturing command receiving unit 31 on graphic display device 12 (S2). The display screen has a predetermined format, and the process is proceeded in an interactive manner with an operator. This display screen is called a "lot formation screen" hereinbelow. The operator prepares necessary materials based on the manufacturing command information displayed on the lot formation screens and enters necessary items (S3).

Figure 8:
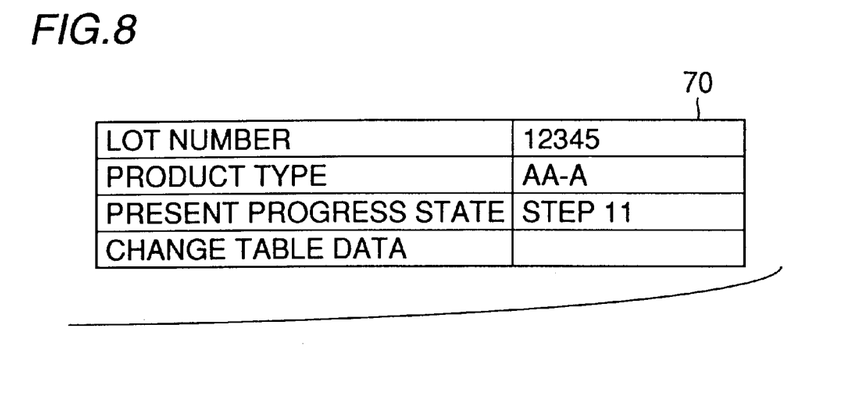
FIG. 8 is a diagram showing an example of the progress file.

Next, progress file forming unit 33 creates a progress file for every lot number, based on the manufacturing command information and the reference information (S4). FIG. 8 shows an example of the progress file. Progress file 70 includes a lot number, a product type, a current progress state, and a change table data. Since this lot is under the first process step, "step 11" representing the first step is shown as the current progress state. The change table data is now blank.

Next, change table detection unit 34 determines whether a change table corresponding to the progress file exists in change table storage unit 40 (S5). At present, it is determined that there is no change table (S5, No), with the change table data column left blank, and the process goes to step S7.

Reference information retrieval unit 36 refers to progress file 70 and extracts the product type "AA-A" and the current progress "step 11" of the product with lot number "12345". It then retrieves the reference information (see FIG. 5) stored in reference information storage unit 41, and detects that the control condition number is "control 11-A". Reference information retrieval unit 36 then refers to the control condition table as shown in FIG. 6, and extracts available device names 62, control conditions 63, and evaluating conditions 64 (S7).

Thereafter, transport device control unit 43 selects a manufacturing device for use from available device names 62 extracted by reference information retrieval unit 36, and transports the items with lot number "12345" to the selected manufacturing device (S8).

Manufacturing device control unit 37 transfers control conditions 63 extracted by reference information retrieval unit 36 to the manufacturing device, and designates a prescribed processing (S11). When the manufacturing device completes the processing, manufacturing device control unit 37 receives from the manufacturing device a processing complete report and data reported for quality evaluation. QC evaluation unit 38 peiforms quality evaluation based on the reported data and evaluating conditions 64 extracted by reference information retrieval unit 36 (S12).

When QC evaluation unit 38 determines that there is no problem, progress file updating unit 39 updates the current progress state of the progress file to the subsequent step "step 12", and stores it in progress file storage unit 42 (S13). The process then goes to step S14.

Reference information retrieval unit 36 retrieves a lot with which all the steps are completed. If such a lot is retrieved (S14, Yes), progress file adjustment unit 35 performs processing to cause the progress file of the retrieved lot to be excluded from objects for further retrieval by reference information retrieval unit 36. The processing of the lot thus is completed. If there is any lot for which processing is not completed (S14, No), the process goes back to step S5 and the subsequent process is repeated. In the case of the above-described lot, the process is repeated for a step following "step 12".

Figure 9:
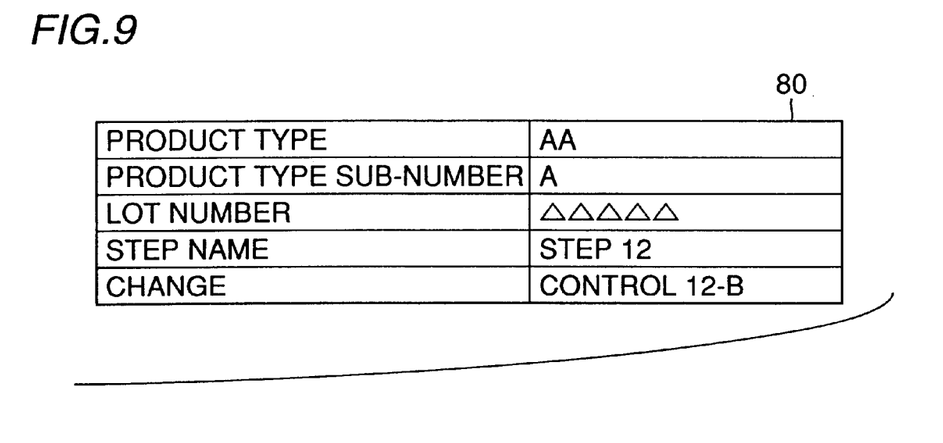
FIG. 9 is a diagram showing an example of the change table to be used by the process control device according to the first embodiment of the present invention.

Now, the case where there is a change table in change table storage unit 40 will be described. FIG. 9 is a diagram showing an example of the change table. Change table 80 includes a product type, a product type sub-number, a lot number, a process step name, and a control condition number to be effective after adjustment. Note that the lot number is recorded as null, so that the retrieval of the change table is performed regardless of the lot number. In other words, the retrieval of the change table is performed by checking whether there exists a change table of which "product type" and "step name" coincide with those of the progress file shown in FIG. 8.

In the flow chart of the process control device according to the present embodiment as shown in FIG. 7, when change table detection unit 34 determines that there exists a corresponding change table in change table storage unit 40 (S5, Yes), the information in the change table (see FIG. 9) is written into the "change table data" of the progress file, to update the progress file (S6). The process then goes to step S7.

In step S7, in response to the data having being written in the change table data within progress file 70, reference information retrieval unit 36 changes the manufacturing condition number "control 12-A" that corresponds to the current progress "step 12" to "control 12-B" that is written in the change table data. Reference information retrieval unit 36 then refers to the control condition table shown in FIG. 6, and extracts available device names 62, control conditions 63 and evaluating conditions 64 corresponding to "control 12-B" (S7).

Next, transport device control unit 43 selects a manufacturing device for use from available device names 62 extracted by reference information retrieval unit 36, and transports the items having lot number "12345" to the selected manufacturing device (S8). Processes after step S11 as described above are then carried out.

The change table may be stored in change table storage unit 40 within the process control device from factory management host computer 1 via LAN, or an operator may store it in change table storage unit 40 by operating the process control device. The control conditions after adjustment (e.g., the above-described "control 12-B") may be stored in the control condition table as shown in FIG. 6, at the same time as or before the storage of the change table.

Though the retrieval of the change table has been carried out by checking whether there is a change table of which "product type" and "step name" coincide with those of the progress file as shown in FIG. 8, it may be carried out by adding a "lot number". For example, if change table 80 shown in FIG. 9 contains lot number "12345", the control condition of the manufacturing step is to be changed only for the items having the lot number "12345".

As described above, according to the process control device of the present embodiment, the control condition of the manufacturing step is changed by retrieving the change table. Accordingly, it is possible to change the processing conditions even when there is work in progress.

Second Embodiment

Figure 10:
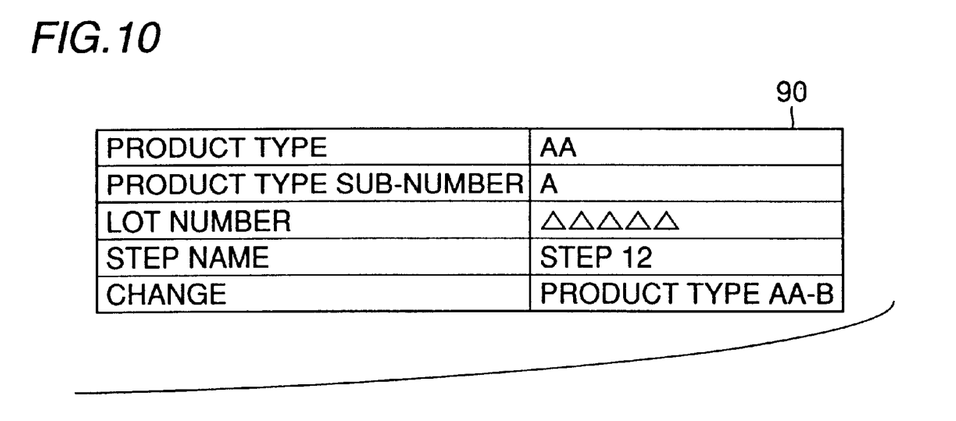
FIG. 10 is a diagram showing an example of the change table to be used by the process control device according to a second embodiment of the present invention.

The configuration and processing procedure of the process control device according to the second embodiment is identical to those of the first embodiment shown in FIGS. 4 and 7, except that the processing in the step S7 of the flow chart shown in FIG. 7 is different. Therefore, the processing will be described as step S7', and description of the same configuration and same function will not be repeated. Note that, in the process control device according to the first embodiment, control condition number "control 12-B" has been written in the "change" column of the change table shown in FIG. 9. In contrast, a product type "type AA-B" is written in the "change" column of the change table shown in FIG. 10, in the case of the process control device according to the present embodiment.

In step S7', since data has been written into the change table data within progress file 70, reference information retrieval unit 36 changes the product type "AA-A" to "AA-B" as appeared in the change table data. Reference information retrieval unit 36 then refers to the reference information shown in FIG. 5, and extracts the reference information corresponding to the product type name "AA-B" (S7'). The process after step S8 is performed based on the reference information corresponding to the product type name "AA-B", and thus, the processing procedure is changed.

As explained above, the process control device according to the present embodiment changes the name of the product type by retrieving the change table. Accordingly, it becomes possible to change the processing orders even when unfinished items are in respective manufacturing steps.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process control device, comprising:
   a change table detection unit to determine whether there exists, corresponding to a progress file representing a manufacturing state, a change table containing a content of change for the progress file;
   a progress file adjustment unit to change, when said change table detection unit determines that there exists a change table, a content of said progress file;
   a transport device control unit to control a transport device of an item in process based on the progress file changed by said progress file adjustment unit;
   a manufacturing device control unit to control a manufacturing device of the item based on the progress file changed by said progress file adjustment unit; and
   a control condition table to include at least a name of a manufacturing device available for a corresponding step and a control condition given to the manufacturing device, wherein
   said progress file adjustment unit changes said content of said progress file based on said change table designating a content of said control condition table.

2. The process control device according to claim 1, further comprising a progress file forming unit to create said progress file from manufacturing command information representing a manufacturing command for each product, and from reference information representing a process step order for each kind of the product.

3. The process control device according to claim 1, wherein said change table detection unit determines existence of a corresponding change table by retrieving a change table having a product type name and a process step name coincident with the product type name and the process step name in the progress file.

4. The process control device according to claim 1, wherein said change table detection unit determines existence of the corresponding change table by retrieving a change table having a product type name, a process step name, and a lot number coincident with the product type name, the process step name, and the lot number in the progress file.

5. The process control device according to claim 1, wherein said progress file adjustment unit changes a control condition number corresponding to a manufacturing condition of said manufacturing device, based on said change table.

6. The process control device according to claim 1, wherein said progress file adjustment unit changes a product type name based on said change table.

7. A process control method, comprising the steps of:
   determining whether there exists, corresponding to a progress file representing a manufacturing state, a change table containing a content of change for the progress file;
   changing, when determined that there exists a change table, a content of said progress file based on the change table;
   controlling a transport device of an item in process based on said changed progress file; and
   controlling a manufacturing device of the item based on said changed progress file.

8. The process control method according to claim 7, further comprising the step of creating said progress file from manufacturing command information indicating a manufacturing command for each product and from reference information indicating a process step order for each kind of the product.

9. The process control method according to claim 7, wherein said step of determining whether there exists a change table includes a step of retrieving a change table having a product type name and a process step name that are coincident with the product type name and the process step name in the progress file, to determine existence of the corresponding change table.

10. The process control method according to claim 7, wherein said step of determining whether there exists a change table includes a step of retrieving a change table having a product type name, a process step name and a lot number coincident with the product type name, the process step name and the lot number in the progress file, to determine existence of the corresponding change table.

11. The process control method according to claim 7, wherein said step of changing the content of the progress file includes a step of changing a control condition number corresponding to a manufacturing condition of said manufacturing device, based on said change table.

12. The process control method according to claim 7, wherein said step of changing the content of the progress file includes a step of changing a product type name based on said change table.

* * * * *